US006186807B1

(12) United States Patent
Simmel

(10) Patent No.: US 6,186,807 B1
(45) Date of Patent: Feb. 13, 2001

(54) ELECTRICAL CONNECTOR ASSEMBLY

(75) Inventor: George M. Simmel, Naperville, IL (US)

(73) Assignee: Molex Incorporated, Lisle, IL (US)

( * ) Notice: Under 35 U.S.C. 154(b), the term of this patent shall be extended for 0 days.

(21) Appl. No.: 09/427,860

(22) Filed: Oct. 27, 1999

(51) Int. Cl.[7] .................................................... H02R 27/00
(52) U.S. Cl. ............................................ 439/218; 439/607
(58) Field of Search .................................... 439/218, 217, 439/221, 223, 224, 607, 79, 78

(56) References Cited

U.S. PATENT DOCUMENTS

| | | | | |
|---|---|---|---|---|
| 4,959,626 | * | 9/1990 | Mouissie | 439/607 |
| 5,257,948 | | 11/1993 | Peterson | 439/571 |
| 5,540,599 | | 7/1996 | Bishop | 439/289 |
| 5,697,799 | * | 12/1997 | Consoli et al. | 439/607 |
| 5,704,808 | | 1/1998 | Chishima | 439/571 |
| 5,993,257 | * | 11/1999 | Maruyama | 439/607 |
| 5,993,258 | * | 11/1999 | Matsunuma et al. | 439/79 |
| 6,056,560 | * | 5/2000 | Wu et al. | 439/607 |

OTHER PUBLICATIONS

Molex Part No. 91181–0001 first sold in the United States in the Fall of 1998.

* cited by examiner

*Primary Examiner*—T. C. Patel
(74) *Attorney, Agent, or Firm*—Stephen Z. Weiss

(57) ABSTRACT

An electrical connector system includes a metal shield having a cavity and being mountable on a substrate in at least two different orientations. A dielectric housing is mountable within the cavity in the shield in at least two different orientations for each orientation of the shield. A plurality of conductive terminals are mountable on the housing in at least two different orientations for each orientation of the housing. Therefore, the total combinations of different orientations of the metal shield, the dielectric housing and the conductive terminals effectively provide at least eight different configurations of electrical connectors.

15 Claims, 6 Drawing Sheets

ELECTRICAL CONNECTOR ASSEMBLY

FIELD OF THE INVENTION

This invention generally relates to the art of electrical connectors and, particularly, to an electrical connector assembly or system wherein the individual components of an electrical connector can be assembled in multiple different orientations to provide different configurations of electrical connectors.

BACKGROUND OF THE INVENTION

Generally, an electrical connector includes some form of dielectric housing which mounts a plurality of conductive terminals. The housing may be mounted in a casing, such as a metal shield which protects the mating interface of the connector from electromagnetic or radio frequency interferences. Electrical connectors of this general type are used in a wide variety of applications, including mounting on printed circuit boards. Consequently, such connectors are provided in a wide variety of configurations, orientations and directional matings to accommodate a myriad of electrical functions.

For example, a printed circuit board mounted electrical connector might be mounted on either side of the printed circuit board. However, if it is desired to preserve the mating orientation of the connector with a complementary mating connector for aesthetic or functional reasons, a different connector must be provided for mounting on one side of the board versus mounting on the opposite side.

Even if the connector is not a board mounted connector, discrete connector components, such as the connector housings, terminals, metal shells or the like, often must be changed to create problems that are very similar in function but are used in different orientations. With a board mounted connector, terminals often must be oriented in different directions relative to the soldering plane of the board.

In order to accommodate mass production of such electrical connectors, it often is required to provide very similar tooling but which is slightly changed to manufacture a plurality of slightly different connectors, such as described above. This near-duplication in tooling significantly increases the manufacturing cost of the connectors by increasing capital expenditures for molds, dies and assembly tools. In addition, tool utilization and output yield rates may vary significantly in relation to the demands for specific product versions. Inventory costs of different connectors also adds to the individual costs thereof. The logistics of warehousing components that may be very difficult to distinguish visually requires multiple (redundant) checks and balances to assure that the correct products are delivered as requested. The present invention is directed to solving these many problems by providing an electrical connector system wherein a plurality of connector components can be assembled in multiple orientations to provide multiple different configurations of electrical connectors.

SUMMARY OF THE INVENTION

An object, therefore, of the invention is to provide a new and improved electrical connector assembly of the character described.

Another object of the invention is to provide a new and improved board mounted electrical connector system.

A further object of the invention is to provide such a system wherein the components of a connector can be assembled in multiple orientations to provide multiple different connector configurations.

In the exemplary embodiment of the invention, the electrical connector assembly or system includes a metal shield having a cavity and which is mountable on a substrate in at least two different orientations. A dielectric housing is mountable within the cavity in the shield in at least two different orientations for each orientation of the shield. A plurality of terminals are mountable on the housing in at least two different orientations for each orientation of the housing. Therefore, the total combinations of different orientations of the metal shield, the dielectric housing and the conductive terminals effectively provide at least eight different configurations of electrical connectors utilizing the same connector components.

As disclosed herein, the metal shield has two sides, either of which is mountable on the substrate, and only one of which has an open seam. The shield can be mounted in one orientation with the seamed side away from the substrate to provide resiliency for the shield, and in a second orientation with the seamed side against the substrate to provide substantially complete shielding at the sides of the shield away from the substrate.

The housing includes polarizing means so that a complementary connector can mate with the housing in only one orientation. Therefore, the mating connector has at least two different orientations relative to the shield.

The terminals are generally U-shaped to define a pair of leg portions joined by a bight portion. Only one of the leg portions of each terminal has a terminating portion whereby the terminating portions are located at different positions relative to the housing corresponding to the at least two different orientations of the terminals. The bight portions of the terminals comprise contact portions for engaging appropriate contact portions of a plurality of terminals of a complementary mating connector. The substrate may be a printed circuit board, and the terminating portions of the terminals, therefore, comprise tail portions for connection to appropriate circuit traces on the printed circuit board.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
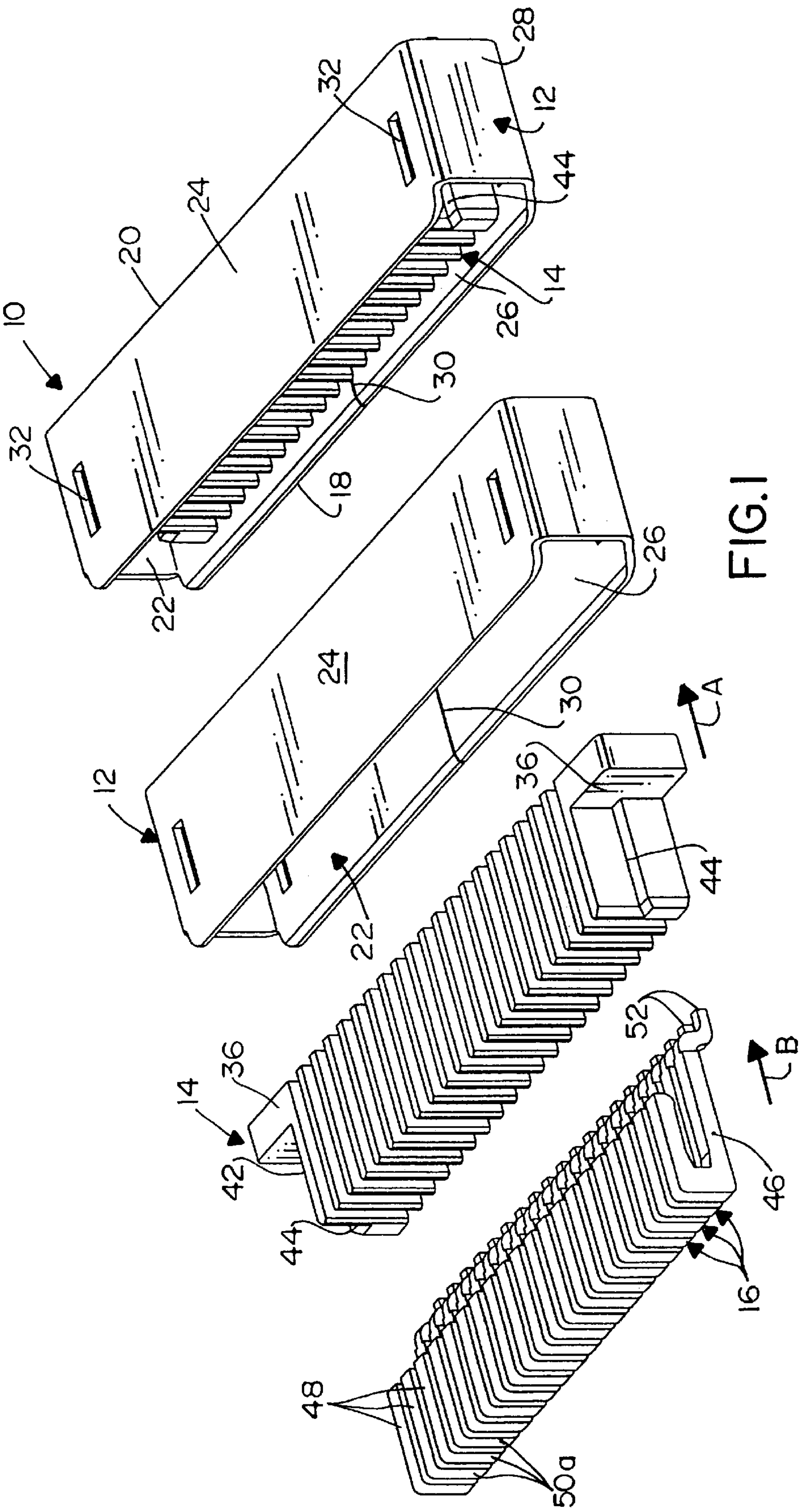
FIG. 1 is a perspective view of an electrical connector according to the invention, along with an exploded perspective view of the components of the connector in given orientations.

Referring to the drawings in greater detail, and first to FIG. 1, the invention is embodied in an electrical connector assembly, generally designated 10, which includes a metal shell or shield, generally designated 12; a dielectric housing, generally designated 14; and a plurality of conductive terminals, generally designated 16. When terminals 16 are mounted on housing 14, and the housing is mounted within shield 12, connector assembly 10 includes a front mating face 18 and a rear terminating face 20.

Figure 7:
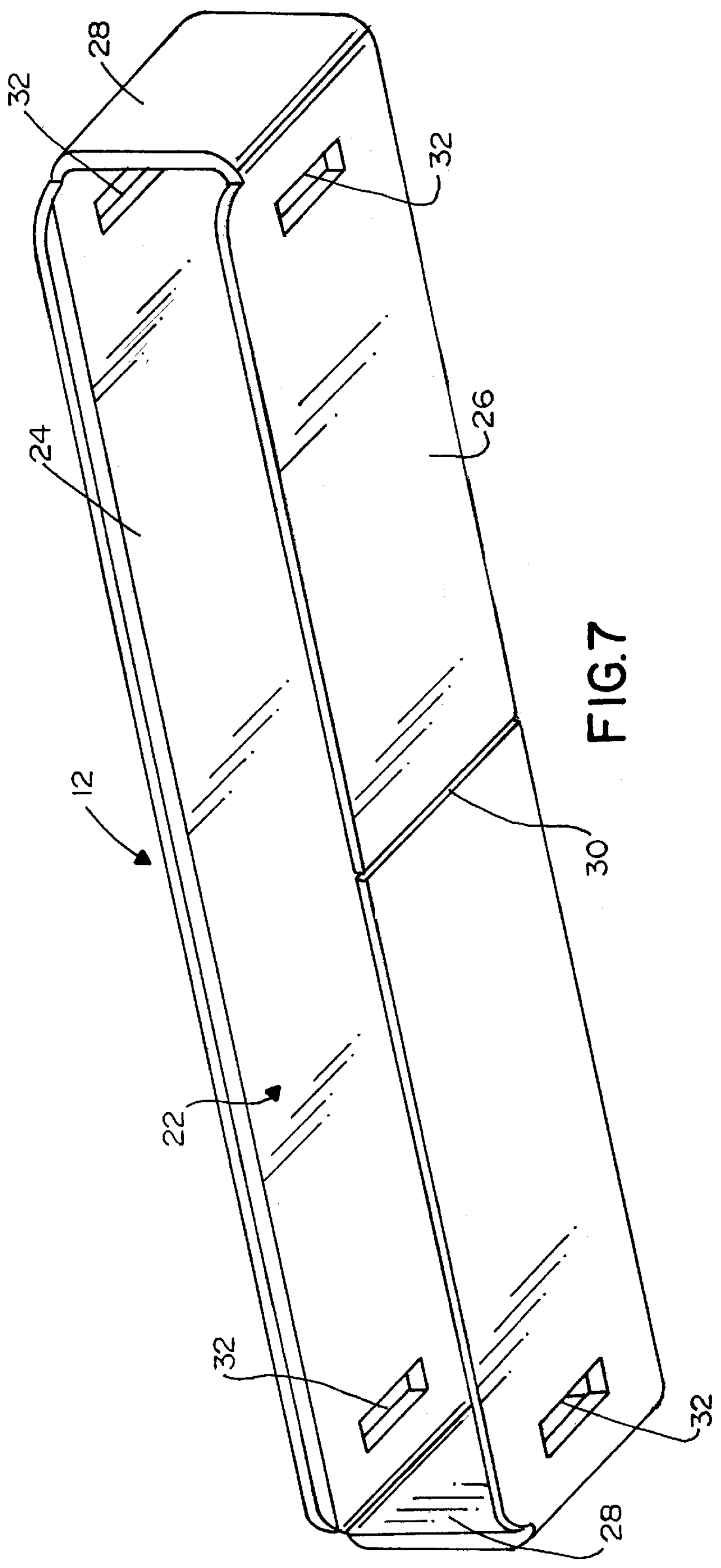
FIG. 7 is a perspective view of the shield looking toward the bottom of the shield as viewed in FIG. 1.

Referring to FIG. 7 in conjunction with FIG. 1, metal shield 12 is stamped and formed of conductive sheet metal material. The shield is generally rectangularly shaped to define an elongated cavity, generally designated 22, for receiving housing 14. The cavity is bounded by two major or elongated sides 24 and 26 and a pair of minor or narrow ends 28. In forming the metal shield, the sheet metal material is folded into the rectangular configuration and a pair of opposing ends of the sheet metal material abut at a seam 30 as seen clearly in FIG. 7. A pair of latch openings 32 are provided at opposite ends of each elongated side 24 and 26 for interengagement with appropriate latches of a complementary mating connector (not shown).

With the above description of metal shield 12, it can be seen that elongated side 26 has open seam 30 therein, while elongated side 24 is void of any seam. Both sides 24 and 26 are planar, and shield 12 is adapted for fixing to a surface of a planar substrate, such as a printed circuit board. The metal shield can be soldered to appropriate pads on the board, for instance. The shield is mountable on the board in either of two different orientations. First, the shield can be mounted as shown in FIGS. 1 and 7, with side 26 and seam 30 located against the board. In this orientation, elongated side 24 and ends 28 are void of any seams and, thereby, provide substantially complete shielding about all sides of the connector except the bottom side mounted to the board. Second, it may be desirable to provide shield 12 with a degree of flexibility, whereupon the shield can be mounted to the board with elongated side 24 at the bottom of the connector and against the board, as will be seen hereinafter. In this second orientation, with open seam 30 being at the top of the connector rather than at the fixed bottom side of the connector, expansion and contraction or resiliency for top side 26 of the shield is provided.

Figure 6:
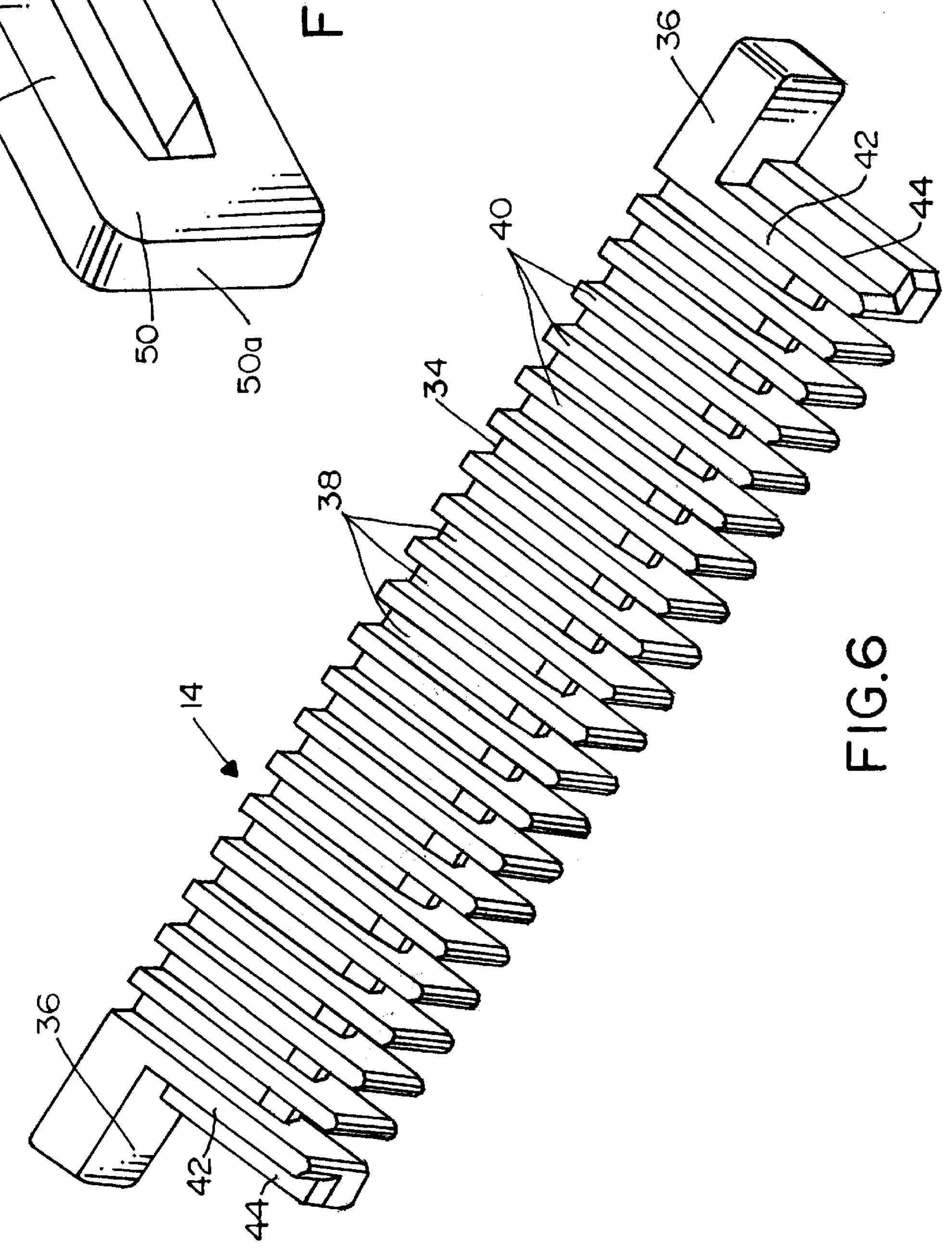
FIG. 6 is a perspective view of the housing.

Referring to FIG. 6 in conjunction with FIG. 1, dielectric housing 14 is a one-piece structure unitarily molded of plastic material or the like. The housing includes an elongated body portion 34 extending between a pair of end wing portions 36. A plurality of wrap-around channels 38 are formed by a plurality of ribs 40 which are spaced longitudinally of body portion 34. In essence, ribs 40 project outwardly from body portion 34 on opposite sides and a front thereof so that channels 38 are generally U-shaped. Finally, a pair of arms 42 project forwardly of wing portions 36 and are formed with polarizing grooves 44 so that the complementary connector can mate with the housing in only one direction. However, as will be seen hereinafter, the housing is insertable into cavity 22 in metal shield 12 in two different orientations. Therefore, the mating connector also will have two different orientations relative to shield 12.

Figure 4:
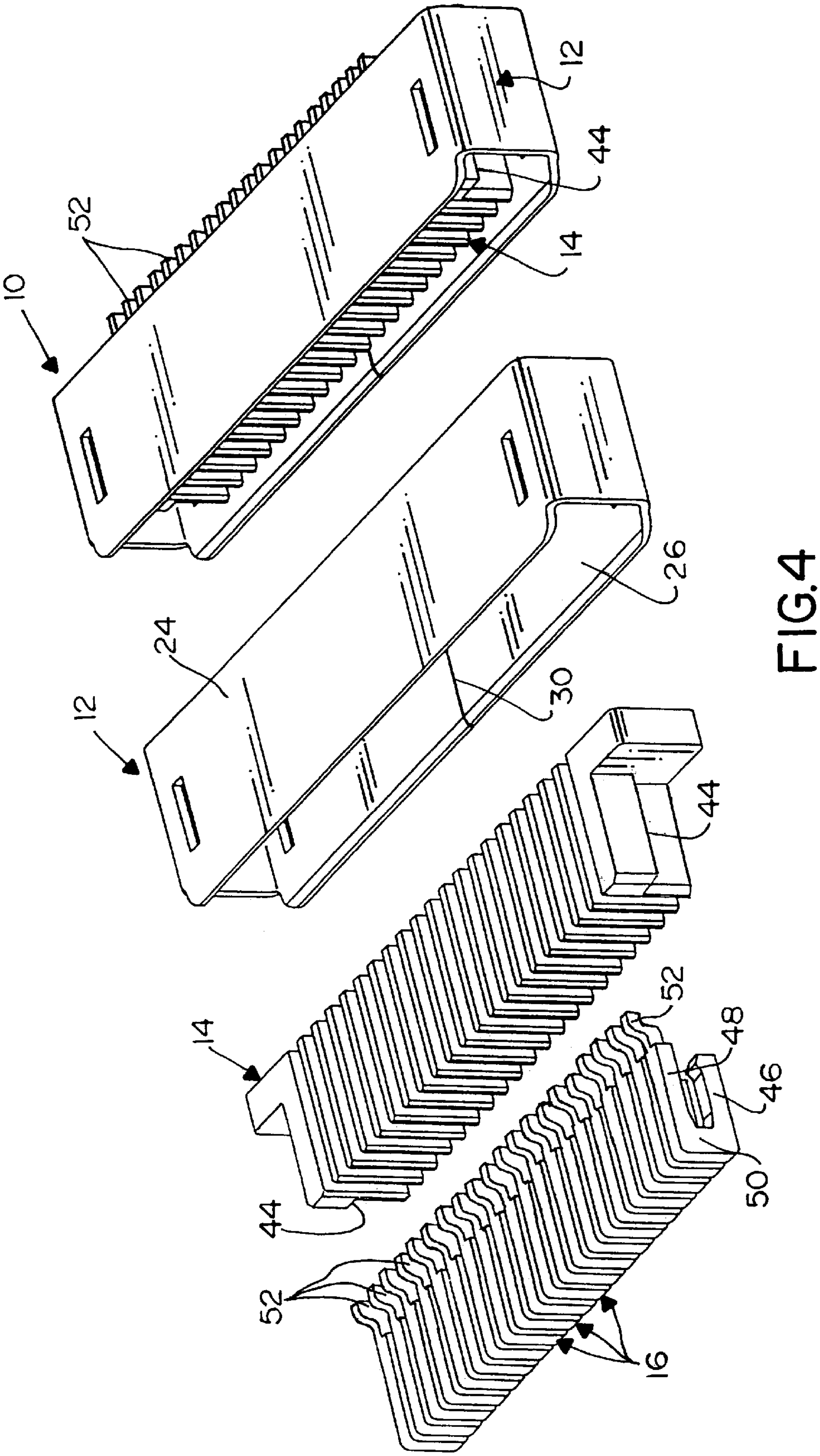
FIG. 4 is a view similar to that of FIG. 1, with the housing and the terminals inverted.
Figure 5:
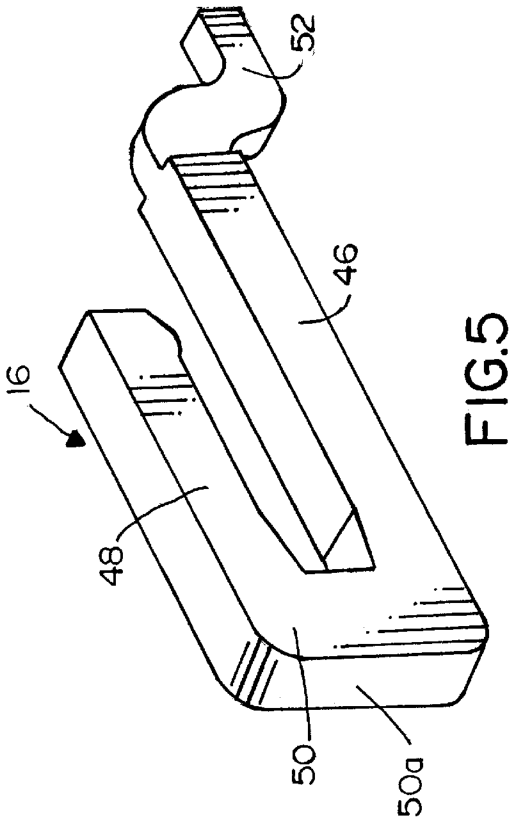
FIG. 5 is a perspective view of one of the terminals.

Referring to FIG. 5 in conjunction with FIG. 4, each terminal 16 is generally U-shaped to define a pair of leg portions 46 and 48 joined by a bight portion 50. The bight portion forms a contact portion of the terminal, with a front face 50*a* of the bight portion engagable with an appropriate contact portion of one of a plurality of terminals of the complementary mating connector. The rear end of leg portion 46 of each terminal is provided with an offset tail 52 for connection, as by soldering, to an appropriate circuit trace on the printed circuit board. The tail is offset so that it is flush with whatever major side 24 or 26 of shield 12 is fixed to the board. U-shaped terminals 16 are mountable in U-shaped channels 38 of housing 14 in either one of two different orientations, as will be seen hereinafter.

Figure 2:
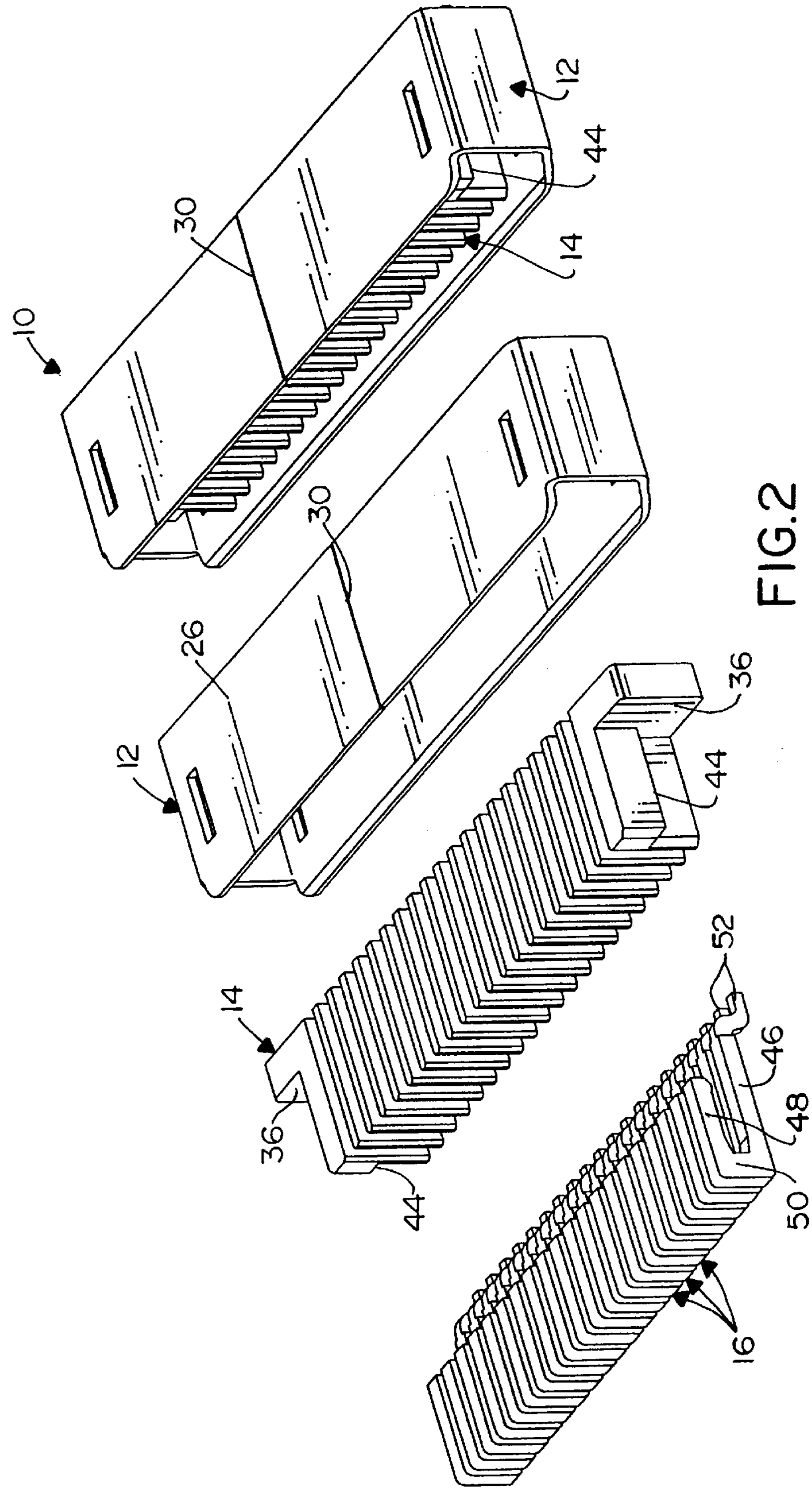
FIG. 2 is a view similar to that of FIG. 1, with the metal shield and the housing of the connector inverted.
Figure 3:
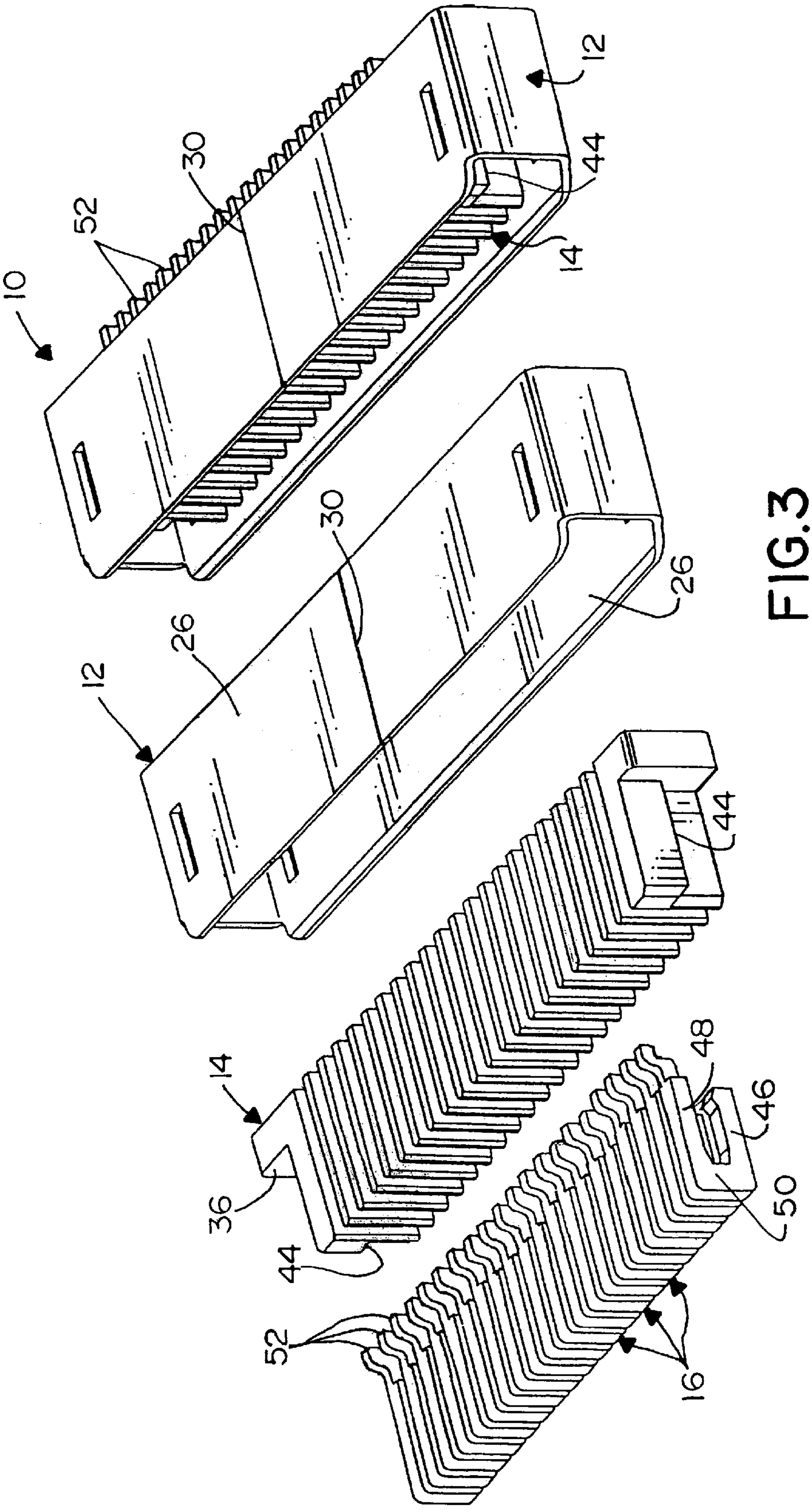
FIG. 3 is a view similar to that of FIG. 1, with only the terminals inverted.

Referring back to FIG. 1, and before proceeding with a description of the different assembly combinations of connector 10 in relation to FIGS. 2–4, it can be recapitulated that shield 12 can be mounted on a substrate, such as a printed circuit board, with seamed side 26 thereof being the bottom the shield and mounted on the substrate in the orientation shown in FIG. 1. Alternatively, the shield can be inverted to mount solid side 24 onto the substrate to afford two different connector configurations for two different functional purposes as described above. Housing 14 is inserted into cavity 22 in the shield in the direction of arrow “A” (FIG. 1) with polarizing grooves 44 facing upwardly as shown. Alternatively, the housing can be inverted so that the polarizing grooves face downwardly. These two different orientations of the housing, in combination with the two different orientations of shield 12, provide four different configurations of electrical connectors. Continuing on, terminals 16 can be mounted on housing 14 in the direction of arrow “B” in two different orientations, i.e., with tails 52 projecting downwardly as shown, or with the terminals inverted so that the tails project upwardly. Adding these two different orientations of the terminals to the different orientations of the housing and the shield, it can be understood that electrical connector 10 can be provided in eight completely different configurations.

This multiple configuration connector system can best be understood by comparing FIGS. 1–4. For instance, in comparing FIG. 2 with FIG. 1, it can be seen that shield 12 has been inverted so that seamed side 26 faces upwardly in FIG. 2 versus the downward orientation of FIG. 1. Likewise, housing 14 has been inverted in FIG. 2 versus the orientation of FIG. 1, so that polarizing grooves 44 of the housing face downwardly in FIG. 2 rather than upwardly as in FIG. 1. Terminals 16 have the same orientations in both FIGS. 1 and 2.

Comparing FIG. 3 with FIG. 1, it can be seen that shield 12 and housing 14 both are in the same orientations in both depictions. In other words, seamed side 26 of the shield faces downwardly and polarizing grooves 44 of the housing face upwardly in both FIGS. 1 and 3. However, it can be seen that terminals 16 have been inverted so that tails 52 project upwardly in FIG. 3 rather than downwardly as in FIG. 1.

Comparing FIG. 4 with FIG. 1, it can be seen that shield 12 is in the same orientation with seamed side 26 oriented downwardly for mounting on a substrate in both FIGS. 1 and 4. However, housing 14 as well as terminals 16 all have been inverted in FIG. 4 versus their orientations in FIG. 1. In other words, polarizing grooves 44 of the housing face downwardly in FIG. 4 rather than upwardly as in FIG. 1, and tails 52 of the terminals project upwardly in FIG. 4 rather than downwardly as in FIG. 1.

From the foregoing comparison of FIGS. 1–4, it can be understood that with the two different possible orientations of metal shield 12, in combination with the two different possible orientations of housing 14 and the two different possible orientations of terminals 16, eight different configurations of electrical connectors can be provided with the identical three components, namely the shield, the housing and the identical terminals. Such a system significantly reduces the costs of molds, dies and assembly tools as well as the costs of having an inventory of eight different connectors, along with the logistics problems of delivering eight different connectors with varying demands.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An electrical connector system, comprising:

a metal shield having a cavity and being mountable on a substrate in at least two different orientations;

a dielectric housing mountable within the cavity in the shield in at least two different orientations for each orientation of the shield;

a plurality of conductive terminals mountable on the housing in at least two different orientations for each orientation of the housing said terminals being generally U-shaped to define a pair of leg portions joined by a bight portion, only one of the leg portions of each terminal having a terminating portion whereby the terminating portions are located at different positions relative to the housing corresponding to said at least two different orientations of the terminals;

whereby the total combinations of different orientations of the metal shield, the dielectric housing and the conductive terminals effectively provide at least eight different configurations of electrical connectors.

2. The electrical connector system of claim 1 wherein said metal shield has two sides either of which is mountable on the substrate and only one of which has an open seam, whereby the shield can be mounted in one orientation with the seamed side away from the substrate to provide resiliency for the shield and in a second orientation with the seamed side against the substrate to provide substantially complete shielding at the sides of the shield away from the substrate.

3. The electrical connector system of claim 1 wherein said dielectric housing includes polarizing means so that a complementary mating connector can mate with the housing in only one orientation, the mating connector thereby having said at least two different orientations relative to the shield.

4. The electrical connector system of claim 1 wherein said bight portions of the terminals comprise contact portions for engaging appropriate contact portions of a plurality of terminals of a complementary mating connector.

5. The electrical connector system of claim 1 wherein said terminating portions of the terminals comprise tail portions for connection to appropriate circuit traces on a printed circuit board.

6. An electrical connector system, comprising:

a metal shield having a cavity and at least two opposite sides either of which is mountable on a substrate and only one of which has an open seam, whereby the shield can be mounted in one orientation with the seamed side away from the substrate to provide resiliency for the shield and in a second orientation with the seamed side against the substrate to provide substantially complete shielding at the sides of the shield away from the substrate;

a dielectric housing mountable within the cavity in the shield in at least two different orientations for each orientation of the shield;

a plurality of conductive terminals mountable on an outer surface of the housing;

whereby the total combinations of different orientations of the metal shield and the dielectric housing provide at least four different configurations of electrical connectors.

7. The electrical connector system of claim 6 wherein said dielectric housing includes polarizing means so that a complementary mating connector can mate with the housing in only one orientation, the mating connector thereby having said at least two different orientations relative to the shield.

8. An electrical connector system, comprising:

a metal shield having a cavity;

a dielectric housing mountable within the cavity in the shield in at least two different orientations, said terminals being generally U-shaped to define a pair of leg portions joined by a bight portion, only one of the leg portions of each terminal having a terminating portion whereby the terminating portions are located at different positions relative to the housing corresponding to said at least two different orientations of the terminals; and a plurality of conductive terminals mountable on the housing in at least two different orientations for each orientation of the housing;

whereby the total combinations of different orientations of the dielectric housing and the conductive terminals effectively provide at least four different configurations of electrical connectors.

9. The electrical connector system of claim 8 wherein said dielectric housing includes polarizing means so that a complementary mating connector can mate with the housing in only one orientation, the mating connector thereby having said at least two different orientations relative to the shield.

10. The electrical connector system of claim 8 wherein said bight portions of the terminals comprise contact portions for engaging appropriate contact portions of a plurality of terminals of a complementary mating connector.

11. The electrical connector system of claim 8 wherein said terminating portions of the terminals comprise tail portions for connection to appropriate circuit traces on a printed circuit board.

12. An electrical connector system, comprising:

a metal shield having a cavity and being mountable on a substrate in at least two different orientations;

a dielectric housing mountable within the cavity in the shield; and a plurality of conductive terminals mountable on the housing in at least two different orientations, said terminals being generally U-shaped to define a pair of leg portions joined by a bight portion, only one of the leg portions of each terminal having a terminating portion whereby the terminating portions are located at different positions relative to the housing corresponding to said at least two different orientations of the terminals;

whereby the total combinations of different orientations of the metal shield and the conductive terminals effectively provide at least four different combinations of electrical connectors.

13. The electrical connector system of claim 12 wherein said metal shield has two sides either of which is mountable on the substrate and only one of which has an open seam, whereby the shield can be mounted in one orientation with the seamed side away from the substrate to provide resiliency for the shield and in a second orientation with the seamed side against the substrate to provide substantially complete shielding at the sides of the shield away from the substrate.

14. The electrical connector system of claim 12 wherein said bight portions of the terminals comprise contact portions for engaging appropriate contact portions of a plurality of terminals of a complementary mating connector.

15. The electrical connector system of claim 12 wherein said terminating portions of the terminals comprise tail portions for connection to appropriate circuit traces on a printed circuit board.

* * * * *